US011746232B2

(12) United States Patent
Xu et al.

(10) Patent No.: US 11,746,232 B2
(45) Date of Patent: Sep. 5, 2023

(54) METHOD OF PREPARING VINYL COLLAGEN MICROSPHERE POLYAMIDE FIBER COMPOSITE MATERIAL

(71) Applicants: Na Xu, Xi'an (CN); Yanmei Xing, Xi'an (CN); Xuechuan Wang, Xi'an (CN)

(72) Inventors: Na Xu, Xi'an (CN); Yanmei Xing, Xi'an (CN); Xuechuan Wang, Xi'an (CN)

(73) Assignee: SHAANXI UNIVERSITY OF SCIENCE AND TECHNOLOGY, Shaanxi (CN)

( * ) Notice: Subject to any disclaimer, the term of this patent is extended or adjusted under 35 U.S.C. 154(b) by 193 days.

(21) Appl. No.: 17/498,181

(22) Filed: Oct. 11, 2021

(65) Prior Publication Data

US 2022/0213318 A1 Jul. 7, 2022

(30) Foreign Application Priority Data

Jan. 4, 2021 (CN) .......................... 202110004775.6

(51) Int. Cl.
| | |
|---|---|
| *C08L 77/00* | (2006.01) |
| *C08J 3/24* | (2006.01) |
| *C08L 89/06* | (2006.01) |
| *D06M 10/00* | (2006.01) |
| *D06M 13/127* | (2006.01) |
| *D06M 13/507* | (2006.01) |
| *D06M 15/15* | (2006.01) |
| *D06M 101/34* | (2006.01) |

(52) U.S. Cl.
CPC ............... *C08L 77/00* (2013.01); *C08J 3/247* (2013.01); *C08L 89/06* (2013.01); *D06M 10/001* (2013.01); *D06M 13/127* (2013.01); *D06M 13/507* (2013.01); *D06M 15/15* (2013.01); *C08J 2389/06* (2013.01); *C08L 2205/16* (2013.01); *C08L 2205/18* (2013.01); *C08L 2312/00* (2013.01); *D06M 2101/34* (2013.01); *D06M 2400/01* (2013.01)

(58) Field of Classification Search
CPC ...... C08L 77/00; C08L 89/06; C08L 2205/16; C08L 2205/18; C08L 2312/00; C08J 3/247; C08J 2389/06; D06M 10/001; D06M 13/127; D06M 15/15; D06M 2101/34; D06M 2400/01; D06M 23/12; C08G 69/48; C08G 69/50; C08G 81/00; C08H 1/06
USPC ......................................................... 523/213
See application file for complete search history.

(56) References Cited

U.S. PATENT DOCUMENTS

2006/0128837 A1* 6/2006 Kanz .................... B60C 1/0008
524/495
2020/0397619 A1* 12/2020 Austin ................... A61B 5/445

* cited by examiner

*Primary Examiner* — Hannah J Pak

(57) ABSTRACT

A method of preparing a vinyl collagen microsphere polyamide fiber composite material includes the following steps: step 1: modifying a collagen with methacrylic anhydride to obtain a vinyl collagen, then emulsifying and cross-linking the vinyl collagen to obtain vinyl collagen microspheres; step 2: treating a polyamide fiber substrate with formaldehyde to obtain a hydroxylated polyamide fiber substrate, treating the hydroxylated polyamide fiber with (3-mercaptopropyl)trimethoxysilane (MPS) to obtain a sulfhydrylated polyamide fiber substrate; and step 3: modifying the sulfhydrylated polyamide fiber substrate with the vinyl collagen microspheres to obtain the vinyl collagen microsphere polyamide fiber composite material.

6 Claims, 12 Drawing Sheets

METHOD OF PREPARING VINYL COLLAGEN MICROSPHERE POLYAMIDE FIBER COMPOSITE MATERIAL

The present application claims priority to Chinese Patent Application No. 202110004775.6, filed on Jan. 4, 2021, which is incorporated by reference for all purposes as if fully set forth herein.

TECHNICAL FIELD

The invention belongs to the technical field of functional textile materials, and specifically relates to a method of preparing a vinyl collagen microsphere polyamide fiber composite material.

BACKGROUND TECHNIQUE

People's lives are inseparable from leather products, but leather wastes are also produced in the leather production process. These wastes are directly discarded, which pollute the environment and cause the waste of resources. These solid leather wastes can be extracted through a series of treatments to recover f collagen. Extracting collagen from tannery waste can not only reduce environmental pollution, but also provide new raw materials for other industries to achieve the purpose of recycling waste and turning waste into treasure. Polymer microspheres are widely used in many fields because of their special shape (spherical), good embedding performance, small size, large specific surface area, and enrichment of functional groups on the surface. Natural polymer materials are commonly used to prepare microspheres for their biodegradability and compatibility. Collagen is a cheap, easy-to-obtain, environmentally-friendly and degradable natural polymer material. It is often used to prepare microspheres for medicine and food, but there are few reports on its application on fiber substrates.

Polyamide fiber is one of the common raw materials for the preparation of clothing because of its good wear resistance, long service life and low price. However, compared with pure natural fabrics, its moisture absorption and moisture permeability performance are poor. The collagen molecular chain contains a large number of hydrophilic groups, such as amino and carboxyl groups. Modifying polyamide fiber with collagen can effectively improve the moisture absorption of the polyamide fiber substrate. Because the collagen is irregular on the substrate and the linear superposition blocks the pores on the substrate, this makes the moisture permeability not very ideal. In response to this problem, considering its microstructure while ensuring the number of polar functional groups on the substrate remains unchanged, the present application is designed to add collagen into microspheres and modify it on polyamide fibers. Based on the morphological characteristics of the microspheres, even if a large amount of collagen is modified on the base fabric, the voids of the substrate will not be completely blocked, thereby reducing the moisture permeability of the substrate. In order to strengthen the bonding strength of the collagen microspheres and the fiber substrate, a chemical method is used to modify the collagen on the polyamide fiber substrate. Since "click chemistry" was proposed by Sharpless in 2001, it has attracted the attention of scientists due to its advantages of high yield, simple reaction conditions, and conformity with atomic economy. It has been used in the fields of photoelectric functional molecular materials and new drug synthesis. Among them, the "mercaptoene" click reaction is used in the synthesis and modification of substances by virtue of the simple and fast photochemical reaction. The invention modifies the polyamide fiber substrate with the vinyl collagen through the "mercaptoene" reaction to improve the moisture absorption and moisture permeability of the substrate.

SUMMARY OF THE INVENTION

The purpose of the present invention is to provide a method for preparing a vinyl collagen microsphere polyamide fiber composite material. The composite material prepared by the method further improves the moisture permeability of the fiber while ensuring a certain hygroscopicity. The added value of fiber materials realizes the resource utilization of leather waste collagen and at the same time expands the application field of collagen microspheres.

In one embodiment, the present invention provides a method of preparing a vinyl collagen microsphere polyamide fiber composite material. The method includes the following steps: step 1: modifying a collagen with methacrylic anhydride to obtain a vinyl collagen, then emulsifying and cross-linking the vinyl collagen to obtain vinyl collagen microspheres; step 2: treating a polyamide fiber substrate with formaldehyde to obtain a hydroxylated polyamide fiber substrate, treating the hydroxylated polyamide fiber with (3-mercaptopropyl)trimethoxysilane (MPS) (trimethoxysilylpropanethiol) to obtain a sulfhydrylated polyamide fiber substrate; and step 3: modifying the sulfhydrylated polyamide fiber substrate with the vinyl collagen microspheres to obtain the vinyl collagen microsphere polyamide fiber composite material.

In another embodiment, the step 1 includes: step 1.1: adding the collagen and a phosphate buffer solution into a flask, heating at 70° C. and stirring until the collagen is completely dissolved, lowering to 50° C., after 20 minutes adding methacrylic anhydride, reacting for 2 hours, wherein a volume ratio of methacrylic anhydride:the phosphate buffer solution is 3:500, dialyzing for 24 hours, freeze-drying for 12-24 hours to obtain the vinyl collagen, and storing the vinyl collagen in a desiccator for later use, wherein a ratio of the collagen:the phosphate buffer solution is 1 g:10 ml; and step 1.2: preparing a vinyl collagen aqueous solution with a concentration of 15% to 40% (wt/wt), adding a liquid paraffin and a surfactant in a volume ratio of 50:1 into a three-necked flask and mixing, placing the three-necked flask in a water bath, stirring at 400-1200 rpm and heating the water bath to 60° C. at the speed of 1° C./min, after 10 minutes adding the vinyl collagen aqueous solution to the liquid paraffin and the surfactant, a volume ratio of the vinyl collagen aqueous solution to the liquid paraffin being 1:4-8, emulsifying for 20 minutes, transferring the three-necked flask to an ice bath at 0-10° C., after 15 minutes adding a glutaraldehyde aqueous solution and cross-linking for 2 hours, the glutaraldehyde aqueous solution added being 0.4%-1% (vol/vol) of the liquid paraffin, adding isopropanol, the isopropanol added being 1/10 (vol/vol) of the liquid paraffin, stirring for 10 minutes, stopping the cross-linking, centrifugating, washing with isopropanol, acetone, and water 3 times to remove impurities, freeze-drying to obtain the vinyl collagen microspheres. The glutaraldehyde aqueous solution has a concentration of 25% (wt/wt).

In another embodiment, in the step 1.1, a pH of the phosphate buffer solution is 7.4; and in the step 1.2, the surfactant is Span80.

In another embodiment, the step 1.2 further includes: heating to 60° C. under agitation to aid solubility to obtain the vinyl collagen aqueous solution.

In another embodiment, the step 2 includes: step 2.1: ultrasonically cleaning the polyamide fiber substrate with acetone for 0.5 hour, the polyamide fiber substrate being a 55-mm-diameter polyamide fiber fabric disc, mixing a 85% (wt) phosphoric acid solution and a 40% (wt) formaldehyde solution at a volume ratio of 3:100 to obtain a solution A, immersing the polyamide fiber substrate in the solution A, reacting at 60° C. for 15 hours, rinsing the polyamide fiber substrate with water to obtain the hydroxylated polyamide fiber; step 2.2: mixing (3-mercaptopropyl)trimethoxysilane and isopropanol in a volume ratio of 7:1000 to obtain a solution B, placing the hydroxylated polyamide fiber prepared in the step 2.1 into the solution B, reacting under nitrogen atomosphere at 70° C. for 12 hours, washing with isopropanol, and drying at 60° C. to obtain the sulfhydrylated polyamide fiber substrate.

In another embodiment, the step 3 includes: step 3.1: immersing the sulfhydrylated polyamide fiber substrate prepared in a 5 mmol/L tris(2-carboxyethyl)phosphine hydrochloride solution for 1 hour to obtain a product A; and step 3.2: preparing a vinyl collagen microspheres aqueous solution with a concentration of 2%-18% (wt/wt), adding a photoinitiator to obtain a solution C, a weight ratio of the photoinitiator:the vinyl collagen microspheres aqueous solution being 0.006%-0.01%, immersing the product A prepared in the step 3.1 into the solution C, sonicating for 30 minutes, reacting under a UV lamp for 3-7 hours to obtain the vinyl collagen microsphere polyamide fiber composite material.

The beneficial effects of the present invention are:

(1) In the method of the present invention, first, methacrylic anhydride modifies leather solid waste collagen, then vinyl collagen microspheres are prepared by an emulsification and cross-linking method. Finally, polyamide fibers modified with the microspheres through "mercaptoene" click chemical reaction on. The force between the collagen microspheres and polyamide fibers is enhance, making the combination of the two stronger, and the functionality of the substrate can last longer. Certain hygroscopicity is ensured, and the moisture permeability of the fiber is further improved. The added value of the fiber material is improved, the resource utilization of leather waste collagen is realized, and the application field of collagen microspheres is expanded.

(2) The method of the present invention uses leather waste collagen as a raw material, which can not only turn waste into treasure and improve economic value, but also open up a new way for the reuse of waste.

(3) The method of the present invention uses the green and efficient "mercaptoene" click chemistry to firmly add the collagen microspheres to the surface of the polyamide fiber in the form of covalent bonds, so that the bonding strength between the collagen and the substrate is increased, and the functionality of the substrate can be maintained for a long time.

DETAILED DESCRIPTION

The present invention will be described in detail below with reference to the drawings and specific embodiments.

Figure 1:
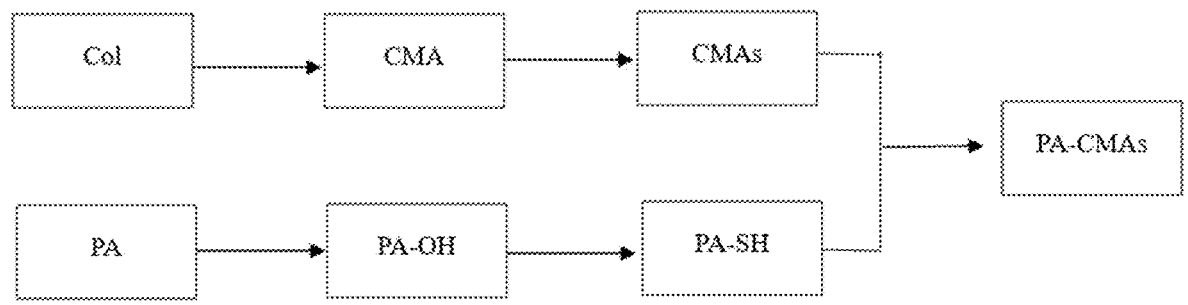
FIG. 1 is an experimental flow chart of the method of the present invention.

The present invention provides a method for preparing a vinyl collagen microsphere polyamide fiber composite material, as shown in FIG. 1. The method is specifically implemented according to the following steps:

Step 1. Methacrylic anhydride modifies collagen to obtain vinyl collagen; then emulsifying and cross-linking vinyl collagen to obtain vinyl collagen microspheres;

Step 1 is implemented according to the following steps:

Step 1.1: preparation of vinyl collagen

A certain amount of collagen and a phosphate buffer solution are added into a Erlenmeyer flask, the Erlenmeyer flask is placed in a constant temperature magnetic and a stirrer at 70° C., heated and stirred until the collagen is completely dissolved. The temperature of the constant temperature magnetic stirrer is lowered to 50° C. A certain amount of methacrylic anhydride is added to the flask to react for 2 hours after 20 minutes. The amount of methacrylic anhydride added is 3/500 of the volume of the phosphate buffer solution, dialyzed for 24 hours, freeze-dried for 12-24 hour, and stored it in a desiccator for later use;

Every 1 g of collagen requires 10 ml of the phosphate buffer solution; the pH of the phosphate buffer solution is 7.4.

Step 1.2: preparation of vinyl collagen microspheres

Preparing a vinyl collagen aqueous solution with a weight concentration of 15% to 40%; adding liquid paraffin and a surfactant in a volume ratio of 50:1 into a three-necked flask and mixing, then placing the three-necked flask in a water bath at 400-1200 rpm, and increasing the temperature of the water bath to 60° C. at the speed of 1° C./min. After 10 minutes, slowly adding the vinyl collagen aqueous solution to the liquid paraffin. The volume ratio of the vinyl collagen aqueous solution to the liquid paraffin is 1:4-8; emulsifying for 20 minutes, quickly transferring to an ice bath at 0-10° C., adding a glutaraldehyde aqueous solution for 2 hours after 15 min. The amount of glutaraldehyde aqueous solution added is 0.4%-1% of the volume of liquid paraffin; continuing to add isopropanol to the emulsion. The amount of isopropanol added is 1/10 of the volume of liquid paraffin, stirring for 10 minutes, stopping the reaction, centrifuging the emulsion to separate vinyl collagen microspheres, and then wash with isopropanol, acetone, and water 3 times to remove impurities. After freeze-drying, pure vinyl collagen microspheres is obtained;

The weight concentration of glutaraldehyde in the glutaraldehyde aqueous solution is 25%; the surfactant is Span80; when preparing the vinyl collagen aqueous solution, it needs to be heated to 60° C. under stirring to aid solubility.

Step 2: treating the polyamide fiber substrate with formaldehyde to obtain hydroxylated polyamide fiber, and treeing the hydroxylated polyamide fiber with (3-mercaptopropyl)trimethoxysilane (MPS) to obtain sulfhydrylated polyamide fiber.

Step 2 is implemented in accordance with the following steps:

Step 2.1: a 55 mm diameter polyamide fiber fabric disc is ultrasonically cleaned with acetone for half an hour, and 85% (wt/wt) phosphoric acid solution and 40% (wt/wt) formaldehyde solution are mixed at a volume ratio of 3:100 to obtain a solution A, and the polyamide fiber substrate is immersed in the solution A, reacting at 60° C. for 15 hours, and then taken out. The polyamide fiber substrate is rinsed with a large amount of running water to obtain the hydroxylated polyamide fiber;

Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 70° C. for 12 hours to obtain the sulfhydrylated polyamide fiber substrate after washing with isopropanol, which is dried at 60° C. to obtain pure sulfhydrylated polyamide fiber substrate.

Step 3. The vinyl collagen microspheres are modified on the sulfhydrylated polyamide fiber substrate through "mercaptoene" click reaction to obtain a vinyl collagen microsphere polyamide fiber composite material.

Step 3 is implemented according to the following steps:

Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;

Step 3.2: using the vinyl collagen microspheres prepared in step 1 to prepare a 2%-18% (wt/wt) vinyl collagen microsphere aqueous solution, adding a certain amount of photoinitiator to it to obtain a solution C. The amount of photoinitiator is 0.006%-0.01% of the weight of the aqueous solution of vinyl collagen microspheres. Immersing the product A prepared in step 3.1 into the solution C, then taking it out for sonication for 30 minutes, and carrying out the mercaptoene click chemistry reaction under a UV lamp for 3-7 hours to obtain the vinyl collagen microsphere polyamide fiber composite material.

Figure 7:
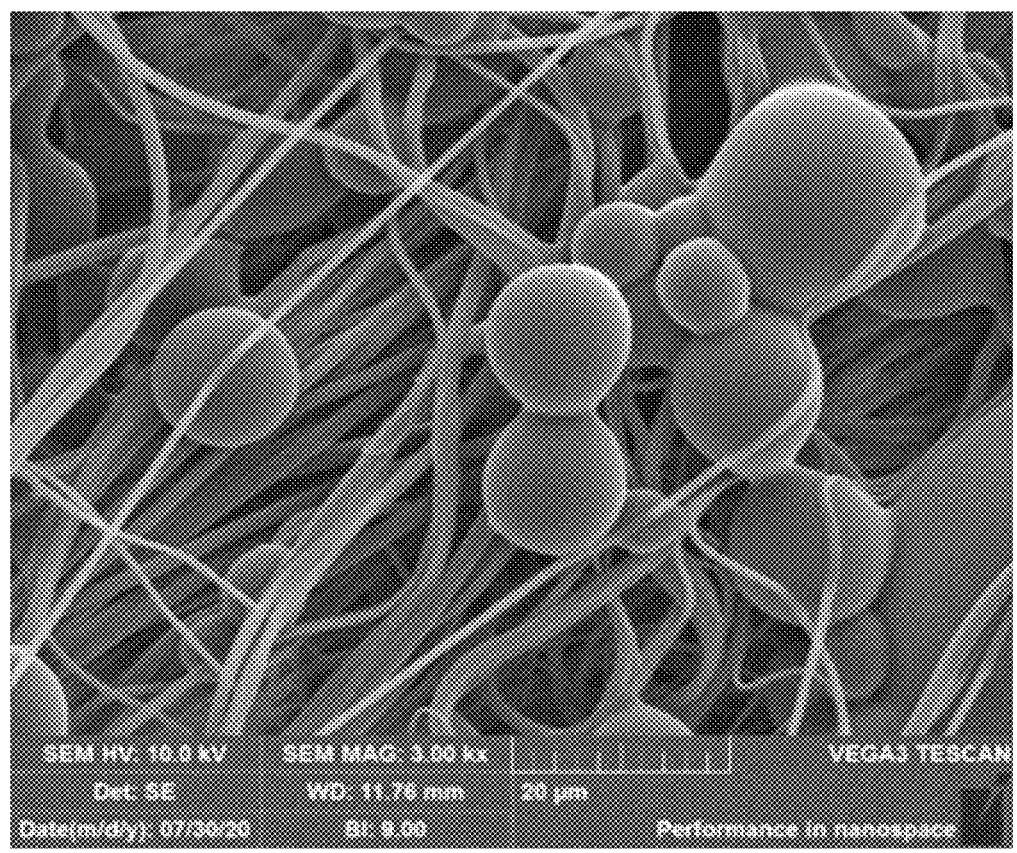
FIG. 7 is an SEM image of a vinyl collagen microsphere polyamide fiber composite material prepared by the method of the present invention.

FIG. 1 is the experimental flow chart of the present invention. The collagen (Col) modified by methacrylic anhydride is prepared into vinyl collagen (CMA) and then vinyl collagen microspheres (CMAs); the surface of the polyamide fiber substrate (PA) is hydroxylated (PA-OH) and then sulfhydryl modified (PA-SH), and then click chemistry is used. A vinyl collagen microsphere polyamide fiber composite material (PA-CMAs) is obtained. The vinyl collagen microspheres were modified on the sulfhydryl polyamide fibers. As shown in FIG. 7, the vinyl collagen microspheres were successfully loaded on the polyamide fibers treated with "mercaptoene" clicks.

Figure 2:
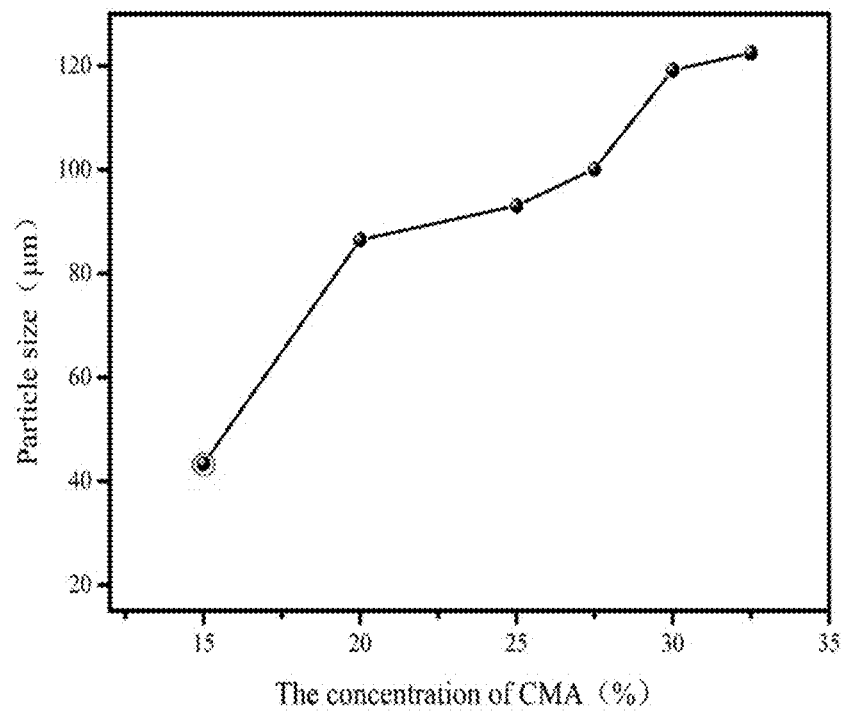
FIG. 2 shows the effect of the concentration of vinyl collagen aqueous solution on the particle size of the microspheres.

FIG. 2 shows the effect of vinyl collagen aqueous solution concentration on the size of microspheres. It can be seen that as the concentration of the solution increases, the viscosity of the solution increases, and the particle size of the microspheres also increases accordingly.

Figure 3:
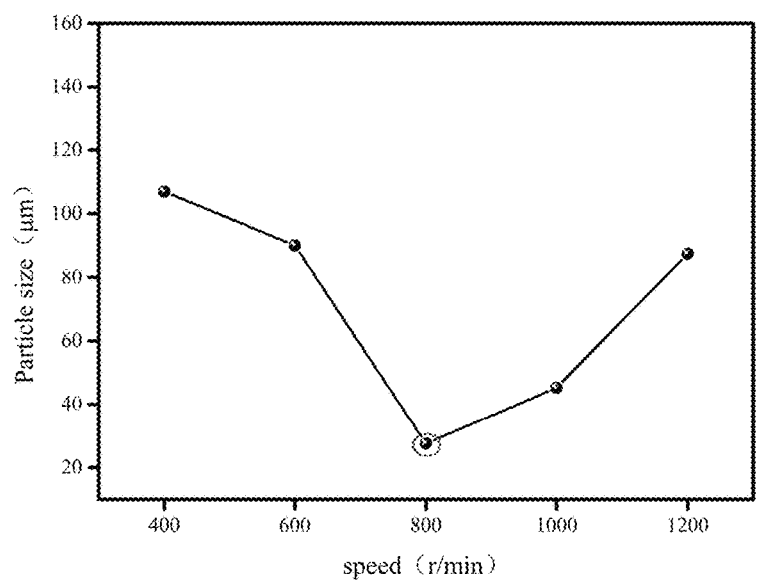
FIG. 3 shows the effect of rotation speed on the particle size of microspheres.

FIG. 3 shows the effect of rotation speed on the size of microspheres. As the rotation speed increases, the particle size of the microspheres first decreases and then increases.

Figure 4:
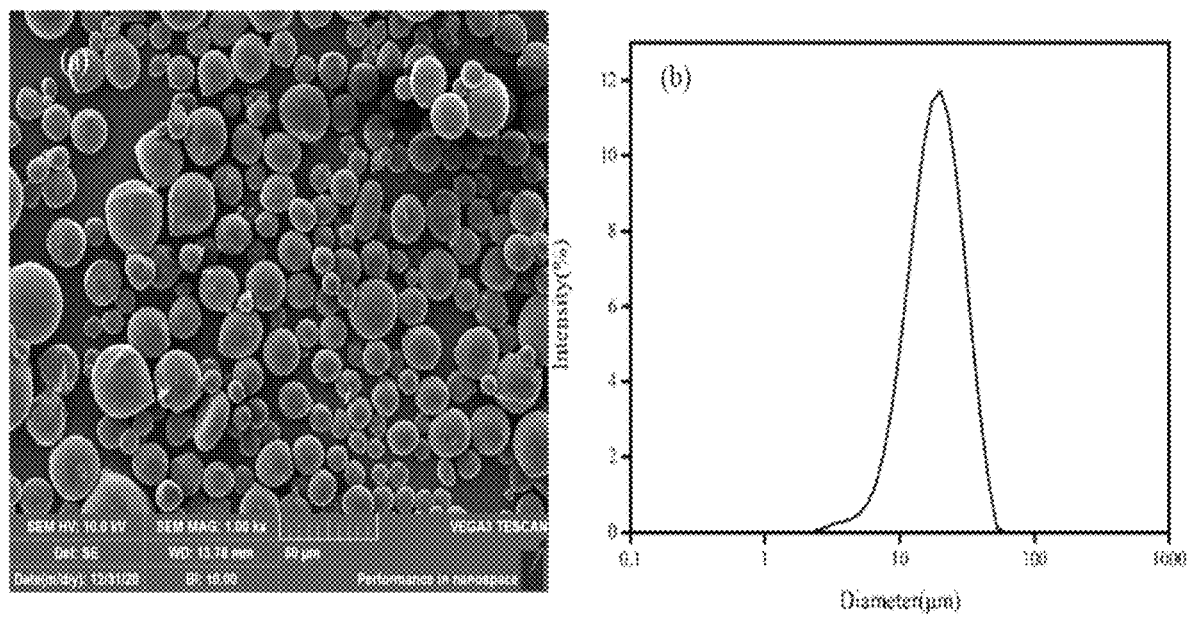
FIG. 4 is an SEM image and a particle size distribution diagram of vinyl collagen microspheres prepared by the method of the present invention.

FIG. 4 is a graph of the morphology and particle size distribution of the prepared vinyl collagen microspheres. It can be seen from the SEM image that the surface of the microspheres is smooth and the morphology is regular. The average particle size of the microspheres measured by the particle size analyzer is 21.20 μm, and the distribution range is narrow, mostly distributed in 20-40 μm.

Figure 5:
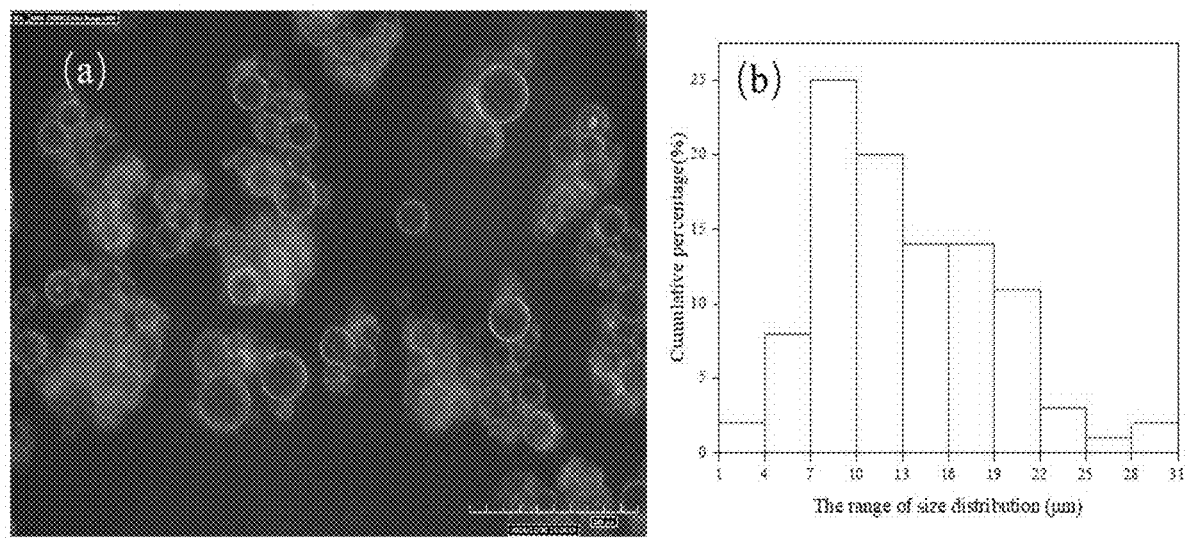
FIG. 5 is a super-depth-of-field microscope image and corresponding particle size distribution diagram of the prepared vinyl collagen microspheres.

FIG. 5 is a super-depth-of-field microscope image of the prepared vinyl collagen microspheres and the corresponding particle size distribution diagram. It can be seen from the figure that the microspheres are full and regular, and the average particle size measured by Nanomeasure is 13.13 μm.

Figure 6:
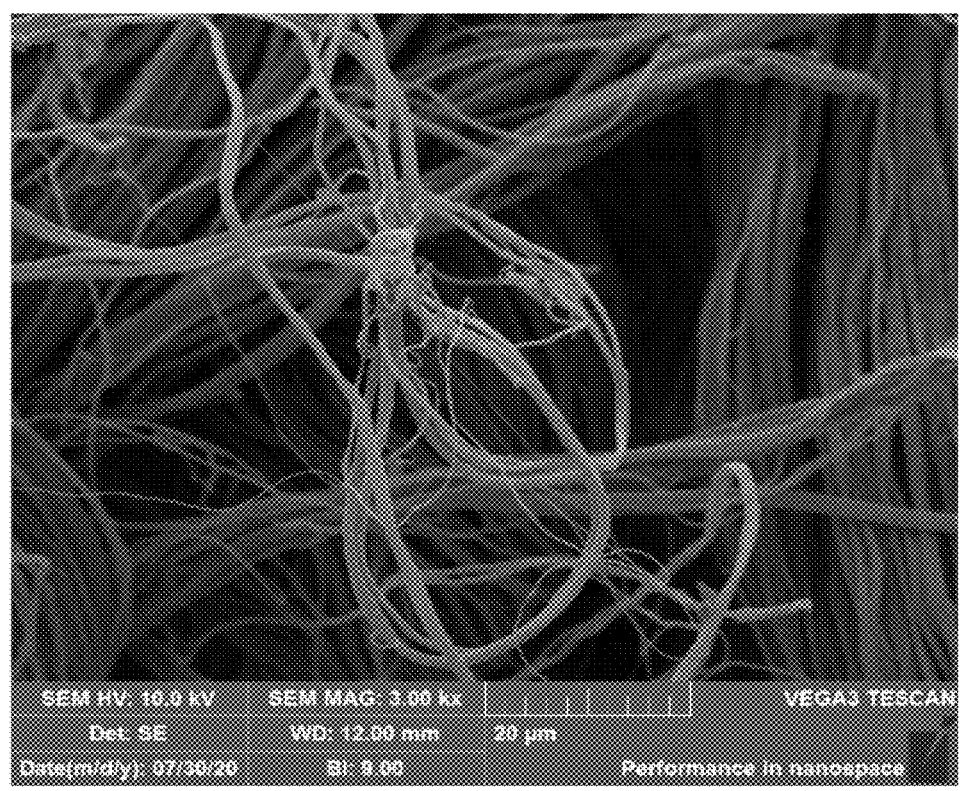
FIG. 6 is an SEM image of untreated polyamide fiber substrate.

FIG. 6 is an SEM image of untreated polyamide fiber substrate. The surface of the substrate is smooth, but there is no other load.

Figure 8:
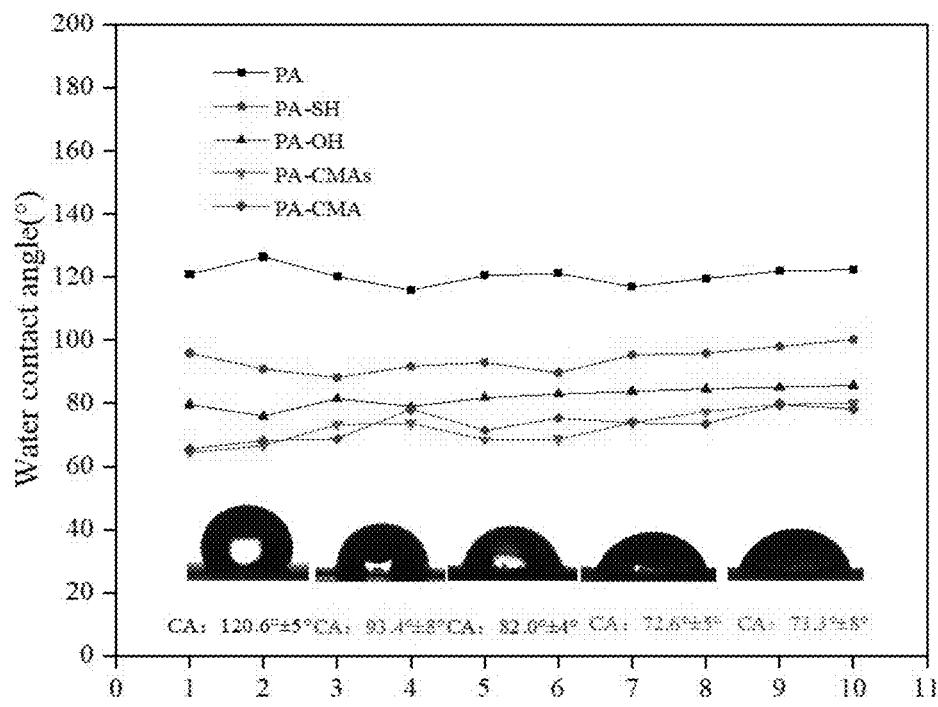
FIG. 8 shows the static contact angle measurement results of different modified polyamide fiber substrates.

FIG. 8 shows the changes in surface hydrophilic and hydrophobic properties of polyamide fibers before and after modification. The polyamide fiber presents a hydrophobic interface before modification (the static contact angle is 120.6°±5°), which further confirms that the number of hydrophilic functional groups in the polyamide fiber is very small. After the surface of the polyamide fiber is hydroxylated, the contact angle of PA-OH is reduced to 82.0°±8°. This is because after the polyamide fiber is hydroxylated, the hydrophilic functional group —OH is introduced on the surface of the fiber. After sulfhydryl modification, mercaptosilane was introduced on the surface of the polyamide fiber, which causes the static contact angle of the PA-SH fiber surface to increase slightly (93.4°±8°), which is greater than the value of the static contact angle of PA-OH. After the surface of the polyamide fiber is modified by collagen linear molecules and collagen microspheres, the static contact angle values of PA-CMA and PA-CMAs are further reduced to 73.3°±8° and 72.6°±5°, respectively. This shows that whether collagen is modified on the surface of polyamide fibers in the form of linear molecules or in the form of microspheres, the static contact angle of the surface are reduced, and a large number of hydrophilic functional groups (—$NH_2$, —COOH) will be introduced to the surface of the fiber), which greatly increases the number of hydrophilic functional groups on the surface of the polyamide fiber, thereby giving the polyamide fiber better hydrophilic properties.

Figure 9:
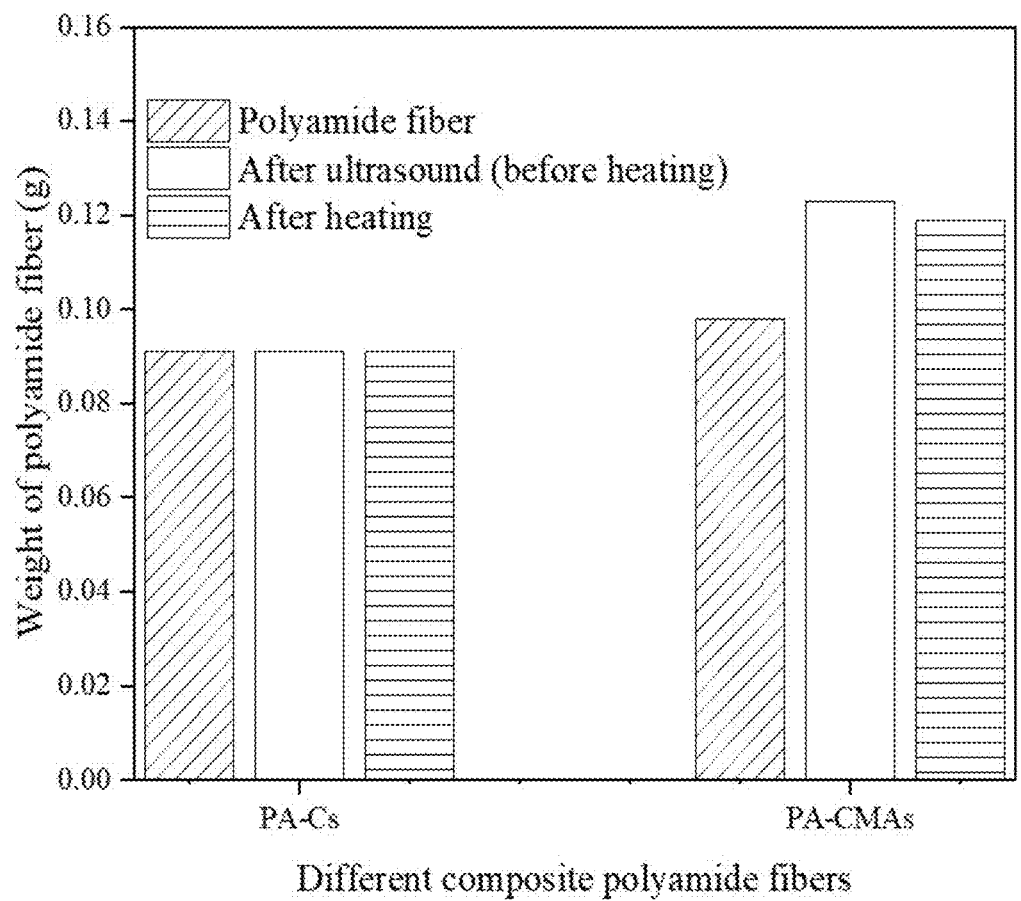
FIG. 9 shows the weight loss changes of different composite materials before and after boiling.

FIG. 9 is a graph showing the weight changes of different composite substrates before and after boiling. The PA-Cs material is a modified material made of polyamide fibers without sulfhydrylization. Therefore, the "mercaptoene" click reaction will not occur during the experiment of modifying the vinyl collagen microspheres. The collagen microspheres are only coated on the polyamide fiber. It is a physical compound, so the microspheres all fall off during the ultrasonic process, and the quality of PA-Cs does not increase after the microsphere modification, which is almost the same as the quality of the unmodified polyamide fiber. In PA-CMAs, because the carbon-carbon double bond on the vinyl collagen microspheres and the sulfhydryl group on the polyamide fiber have a "mercaptoene" click reaction, the vinyl collagen is firmly modified to the fiber in the form of a covalent bond. After ultrasound, most of the collagen microspheres still remain on the surface of the fiber, so the quality of the polyamide fiber is significantly increased. After boiling PA-CMAs in 100° C. boiling water for 30 minutes, the mass reduction is limited compared with the PA-CMAs after ultrasonic washing. This further shows that the carbon-carbon double bonds on the vinyl collagen microspheres and polyamide The mercapto group on the fiber undergoes a "mercaptoene" click reaction, and is successfully modified on the polyamide fiber, and has good moisture and heat stability.

Figure 10:
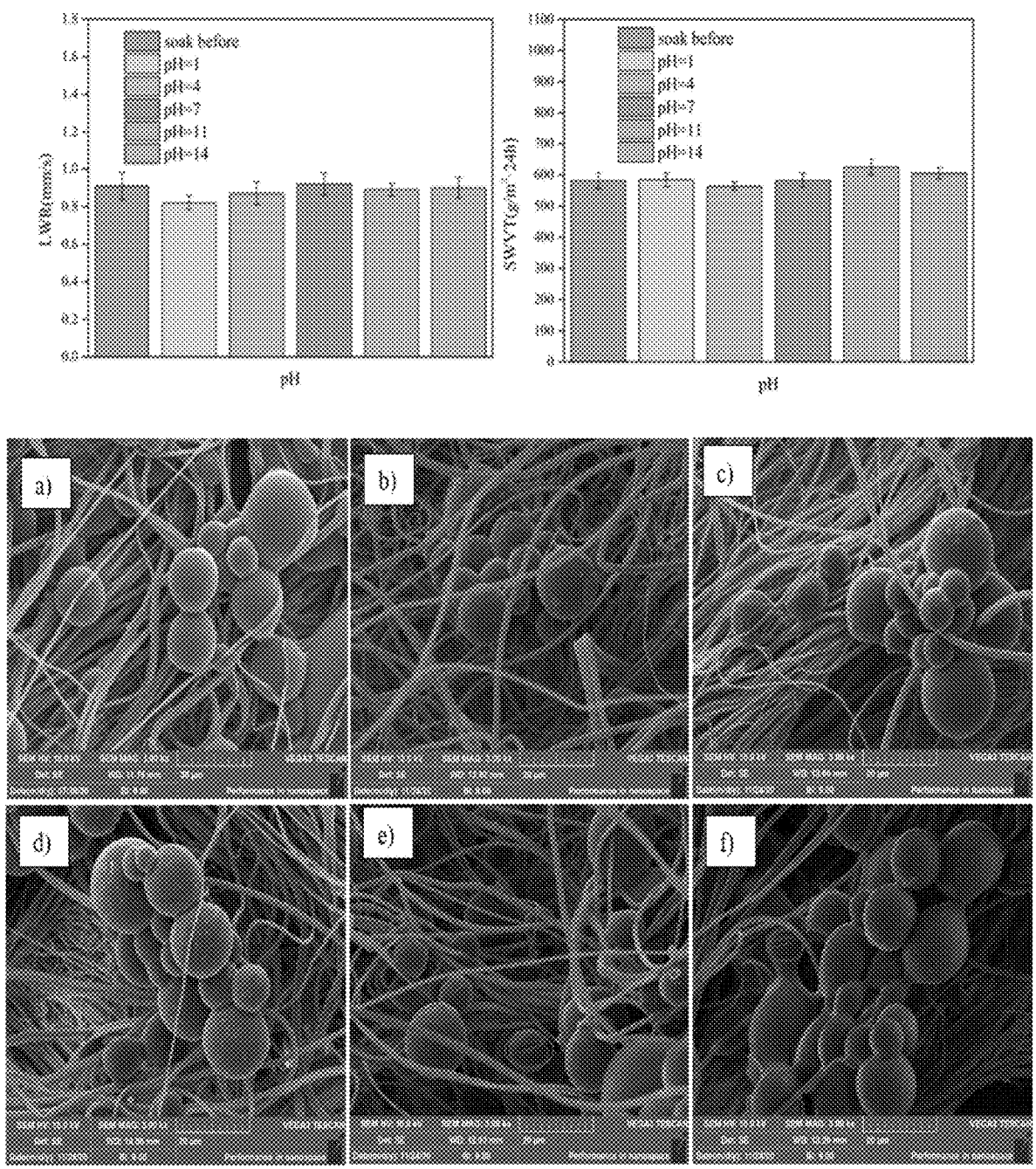
FIG. 10 shows the LWR, SWVT and corresponding SEM images of PA-CMAs before and after immersion in different pH solutions.
Figure 11:
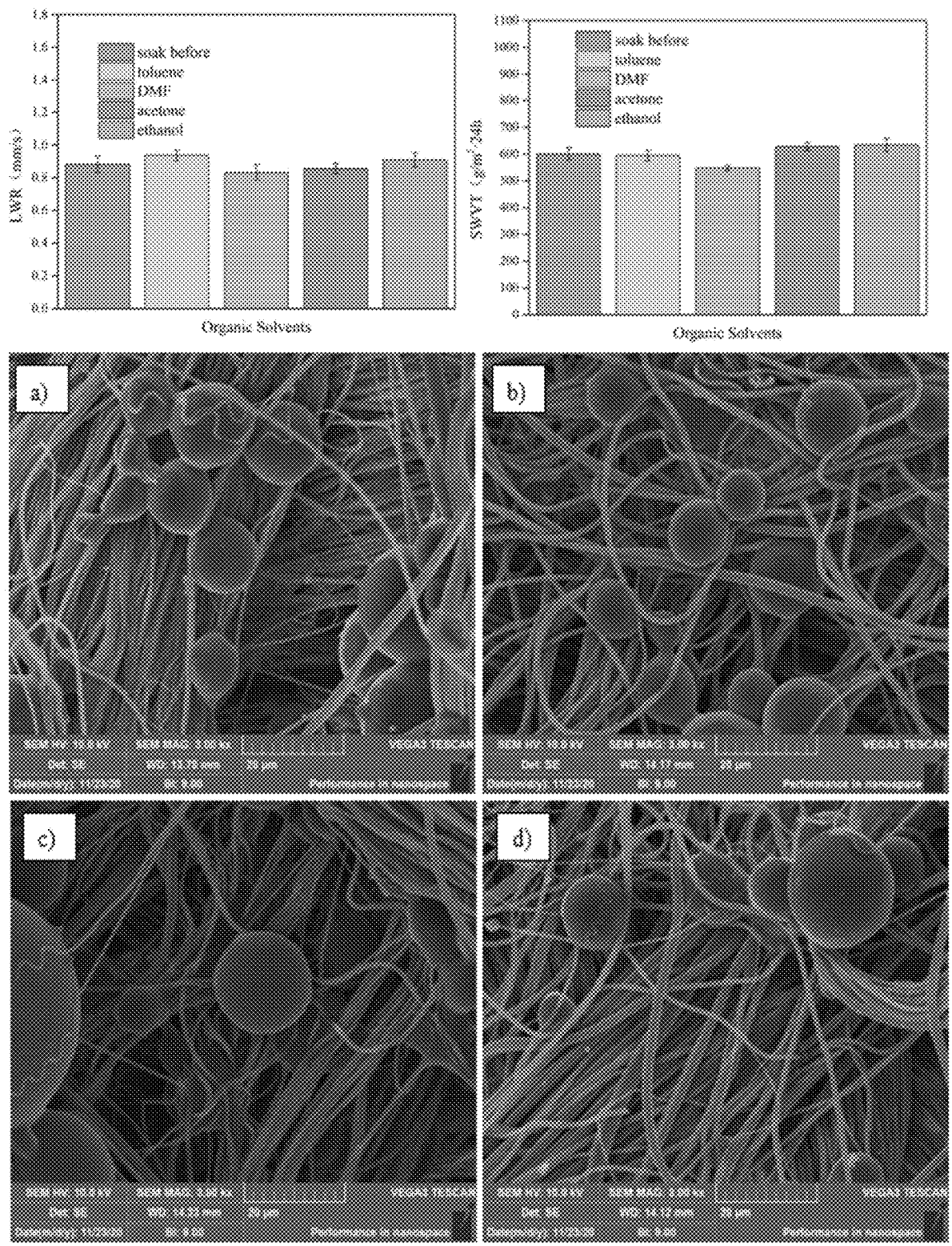
FIG. 11 shows the LWR, SWVT and corresponding SEM images of PA-CMAs before and after immersion in different organic solvents.

FIG. 10 shows the hygroscopicity, moisture permeability and SEM pictures of PA-CMAs before and after immersing in different pH solutions for 72 hours. FIG. 11 shows the hygroscopicity, moisture permeability and SEM pictures of PA-CMAs before and after immersing in different organic solvents for 72 hours. From the data in the figure, it can be seen that the moisture absorption and moisture permeability of the polyamide fiber before and after soaking are within the error range, and there is no significant change. The overall morphology of PA-CMAs immersed in different solutions did not change significantly, but in acidic and alkaline solutions, the surface of the microspheres would have some scratches. It shows that the vinyl collagen microspheres are firmly modified on the PA fiber and have excellent acid resistance, alkali resistance and organic solvent resistance.

Figure 12:
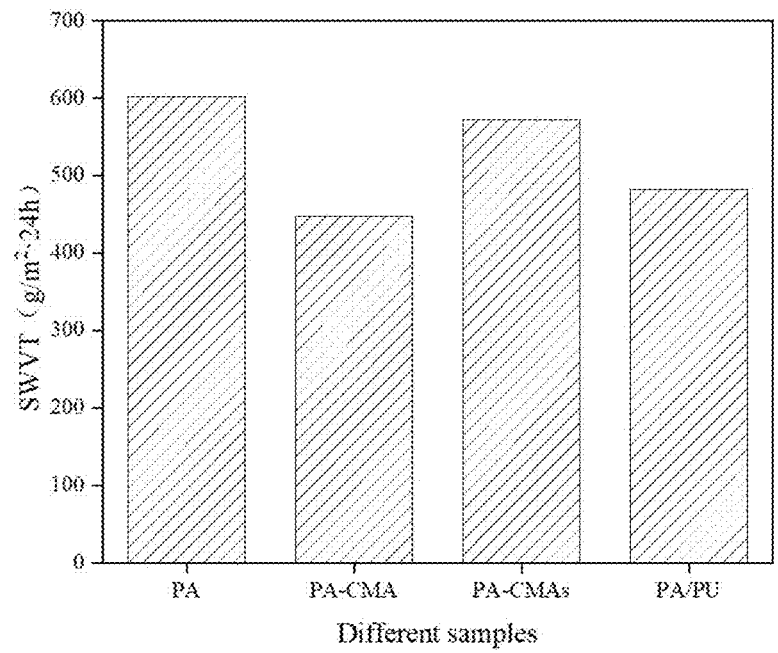
FIG. 12 shows the influence of different treatment methods on the moisture permeability of polyamide fiber substrates.

FIG. 12 shows the moisture permeability of the substrate under different treatments. The data shows that untreated polyamide fibers (PA) have the best moisture permeability, followed by vinyl collagen microspheres modified polyamide fibers (PA-CMAs). The moisture permeability of both is better than the current mainstream market. The superfine fiber synthetic leather substrate (PA/PU). The moisture permeability of polyamide fibers (PA-CMA) modified with linear vinyl collagen is the worst.

Figure 13:
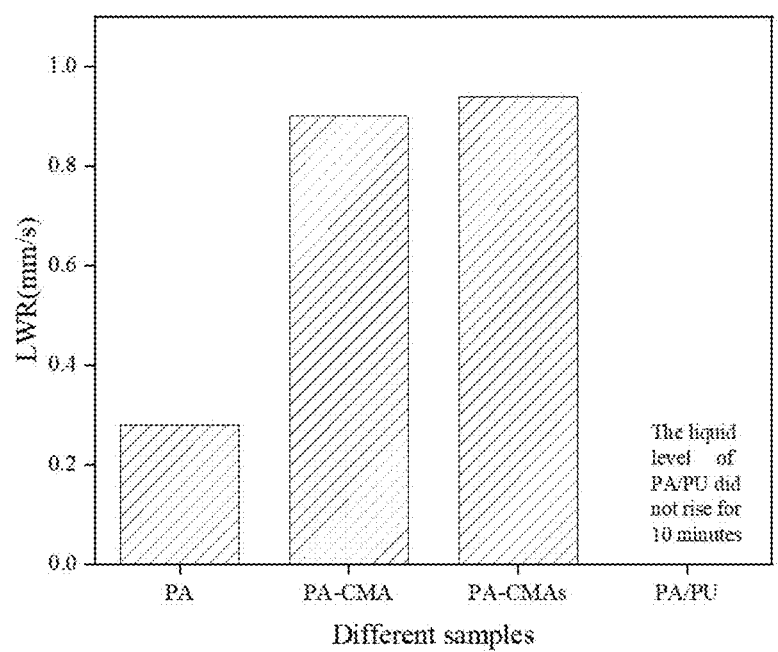
FIG. 13 shows the influence of different treatment methods on the moisture absorption properties of polyamide fiber substrates.

The hygroscopicity data in FIG. 13 shows that the hygroscopicity of vinyl collagen microspheres modified polyamide fibers (PA-CMAs) is close to that of vinyl collagen modified polyamide fibers, and the hygroscopicity of both is better than Unmodified polyamide fiber has the hygroscopicity, and PA/PU has the worst hygroscopicity. Therefore, compared with PA/PU and linear collagen-modified polyamide fiber substrate, the moisture permeability of the polyamide fiber substrate modified by collagen microspheres is very superior, and it also has good moisture absorption performance.

Figure 14:
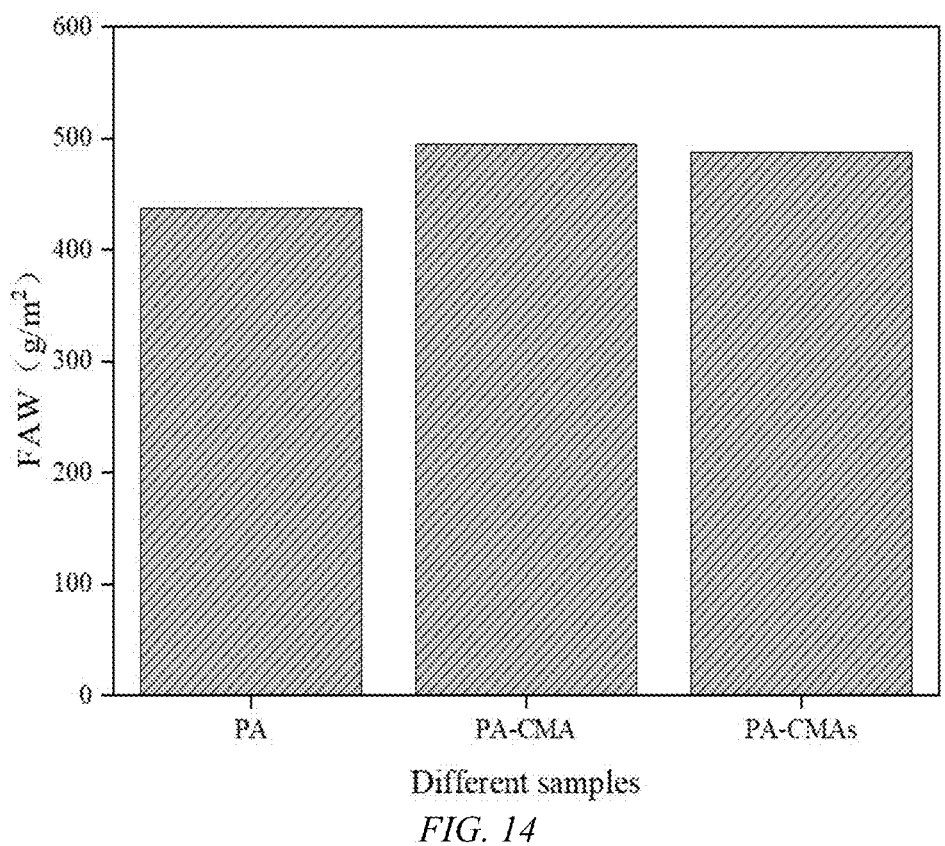
FIG. 14 is a comparison chart of the basic weight per unit area (FAW) under different treatment methods.

FIG. 14 shows the basis weight per unit area under different treatment methods. The substrate loaded with vinyl collagen is the heaviest, followed by the loaded microspheres. The uniformity of the substrate is better than that of unmodified polyamide fibers.

Figure 15:
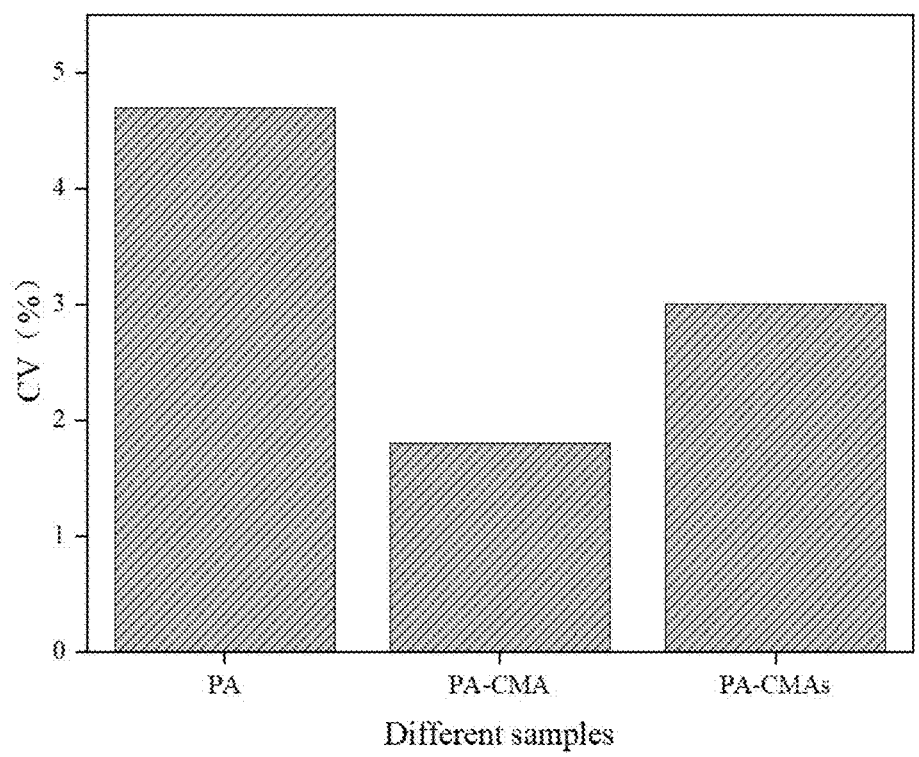
FIG. 15 is a comparison diagram of dispersion coefficients of substrates under different processing methods.

FIG. 15 is the dispersion coefficient of the substrate under different processing methods. With the loading of collagen, the dispersion coefficient of the substrate decreases, but due to the uneven distribution of the microspheres on the substrate (caused by the morphological difference of collagen), the CV % of the substrate loaded with vinyl collagen microspheres The value is higher than that loaded with vinyl collagen.

Figure 16:
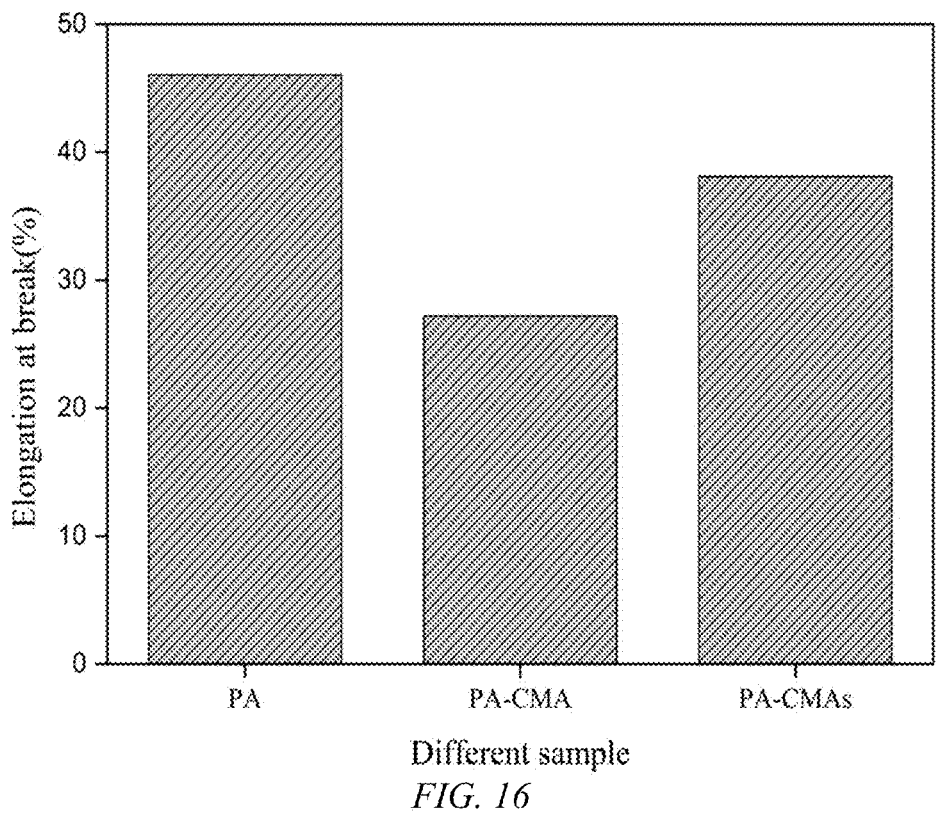
FIG. 16 is a comparison diagram of elongation at break of substrates under different treatment methods.

FIG. 16 shows the elongation at break of the substrate under different treatments. In the test of elongation at break, the elongation at break of PA-CMAs has decreased compared with the original base material, but the degree of decrease is not as great as that of PA-CMA, and the base material still has good elasticity and plasticity.

Figure 17:
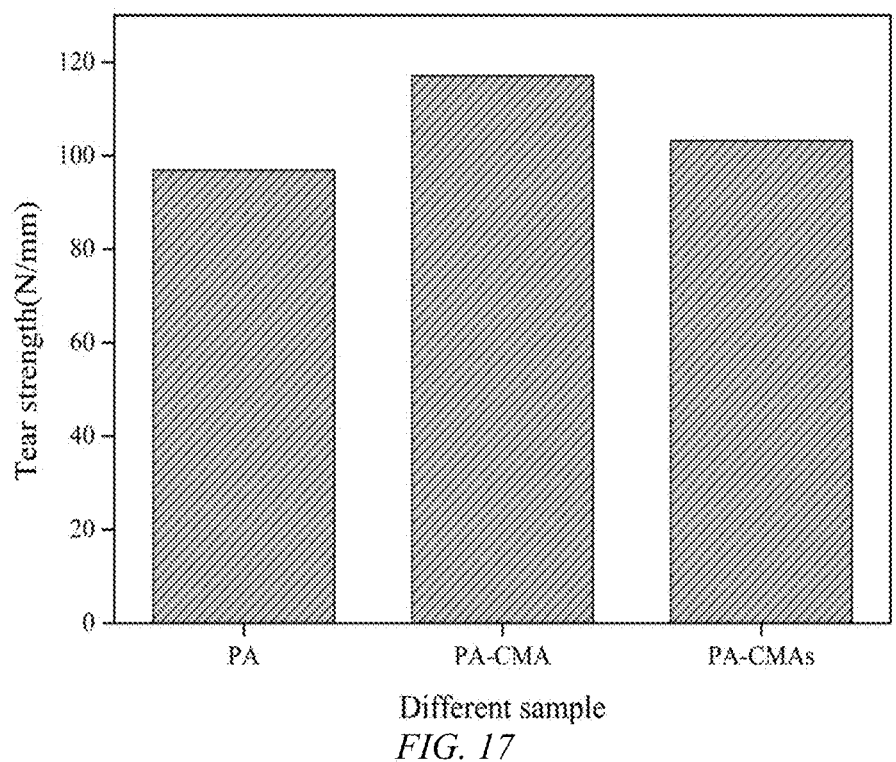
FIG. 17 is a comparison diagram of the tearing strength of the substrate under different treatment methods.

FIG. 17 shows the tear strength of the substrate under different treatments. Since the introduction of collagen increases the ability of the polyamide fiber substrate to resist external forces, the tear strength of the modified substrate is increased.

Figure 18:
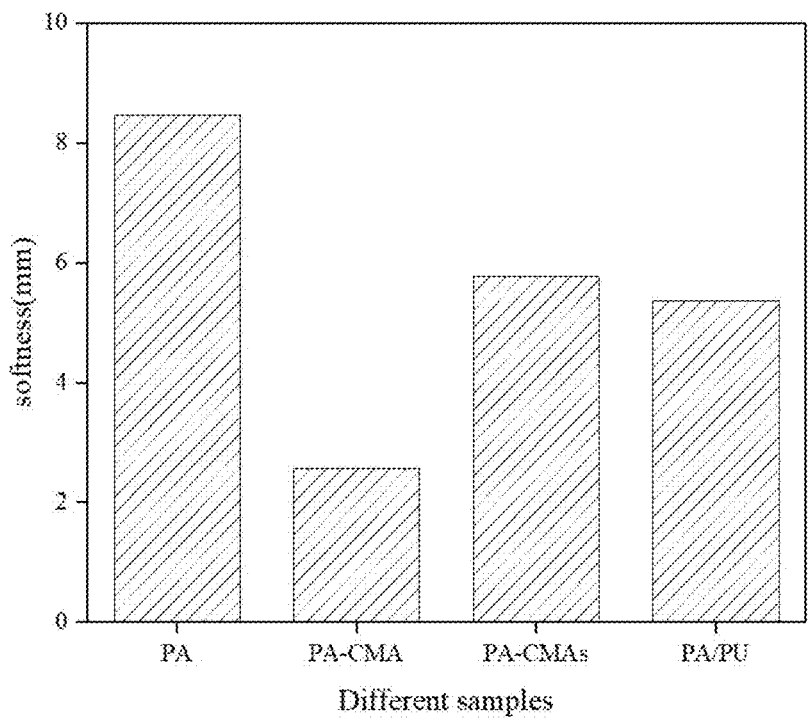
FIG. 18 is a comparison diagram of the softness of substrates under different treatments.

FIG. 18 shows the softness of the substrate under different treatments. In the softness test, the introduction of collagen reduces the softness of the original substrate, but the degree of decrease of PA-CMAs is not as great as that of PA-CMA, and the softness of PA-CMAs is much better than that of PA-CMA.

Figure 19:
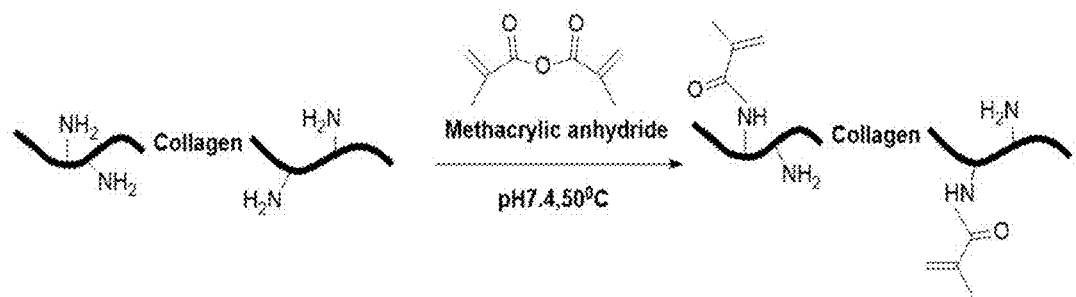
FIG. 19 is a schematic diagram of the reaction of vinyl collagen in the method of the present invention.

The present invention will be explained in terms of principle as follows:

In step 1, the preparation principle of vinyl collagen is that the amino group on the collagen molecular chain undergoes a nucleophilic substitution reaction with the anhydride of methacrylic anhydride. The amino group acts as a nucleophilic group to attack the carbon in one of the carboxyl groups of the anhydride, and then the carboxyl group is removed, forming an amide bond. The chemical reaction is shown in FIG. 19.

Figure 20:
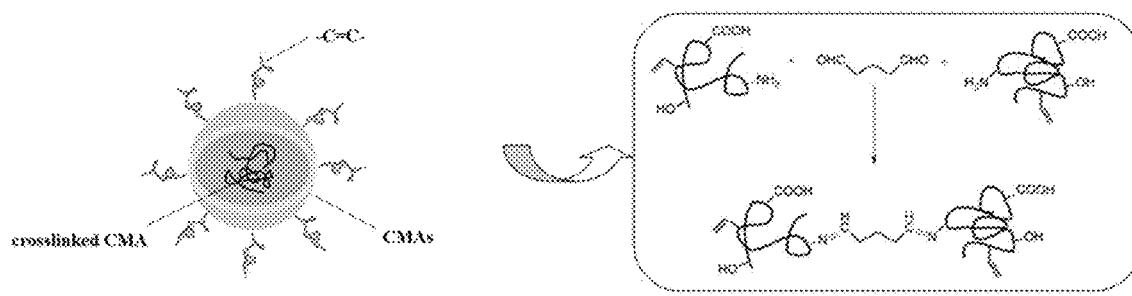
FIG. 20 is a schematic diagram of the cross-linking of vinyl collagen microspheres in the method of the present invention.

The principle that vinyl collagen is cross-linked into vinyl collagen microspheres in the emulsification process is that the amino groups on the collagen molecular chain and the aldehyde groups of glutaraldehyde undergo aldoamine condensation to form an amide bond. Glutaraldehyde acts as a "bridge" to connect vinyl collagen chains, as shown in FIG. 20.

Figure 21:
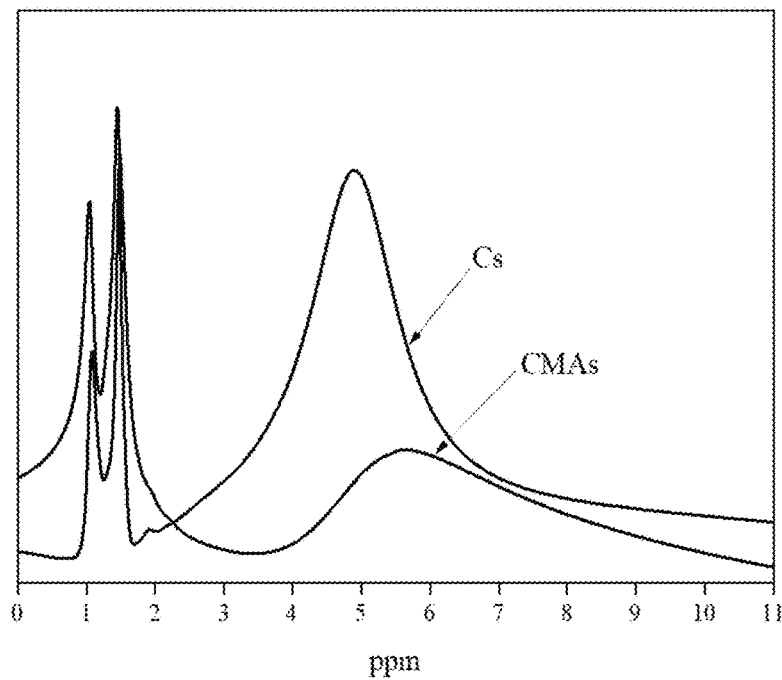
FIG. 21 is a $^1H$ solid-state NMR comparison chart of collagen microspheres and vinyl collagen microspheres.

Compared with collagen microspheres, vinyl collagen microspheres are modified with double bonds, and the signal peak of unsaturated bonds just appears at 5.4-6 ppm, which proves that there are double bonds on the microspheres, as shown in FIG. 21.

In step 3, the "mercaptoene" of vinyl collagen microspheres is click-modified on the sulfhydryl polyamide fiber substrate to obtain a vinyl collagen microsphere polyamide fiber composite material.

Figure 22:
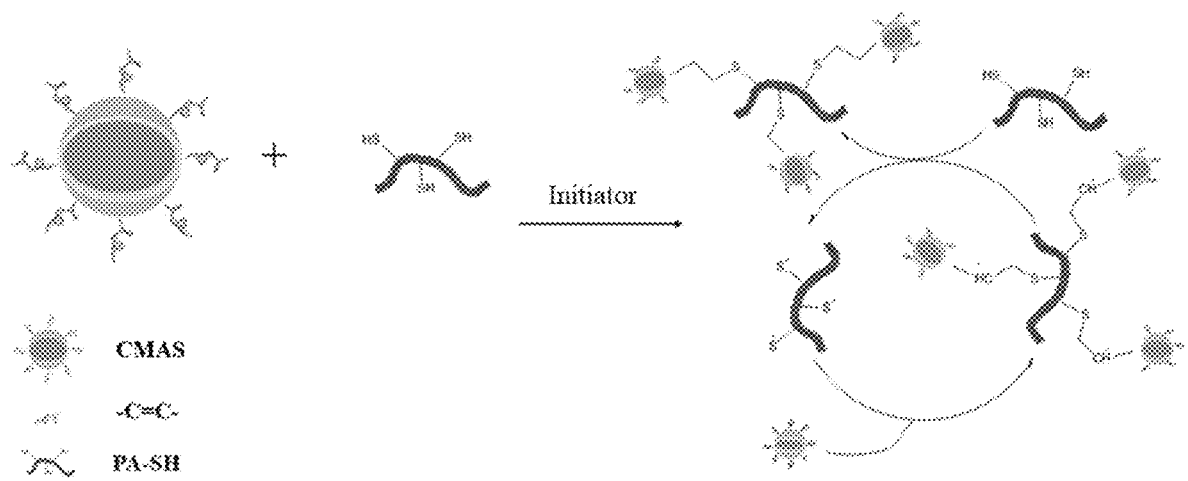
FIG. 22 is a schematic diagram of vinyl collagen microspheres "mercaptoene" click-modified polyamide fibers in the method of the present invention.

The main principle of the modification of vinyl collagen microspheres on the sulfhydryl polyamide fiber substrate in this step is the addition reaction initiated by free radicals. That is, the initiator absorbs photons under light conditions, cracks to generate free radicals, and the free radicals deprive the hydrogen atoms of the sulfhydryl groups on the sulfhydryl polyamide fibers to generate sulfhydryl radicals, which attack the double bonds on the vinyl collagen microspheres, and further Alkyl radicals are generated, and the alkyl radicals further attack the hydrogen atoms in the sulfhydryl functional groups on the surface of the polyamide fiber, and once again generate sulfhydryl radicals, which enter the circulation, as shown in FIG. 22.

EXAMPLE 1

The method of preparing vinyl collagen microsphere polyamide fiber composite material was specifically implemented according to the following steps:

Step 1: collagen was modified by methacrylic anhydride to obtain vinyl collagen; then the vinyl collagen was emulsified and cross-linked to obtain vinyl collagen microspheres;

Step 1 was implemented according to the following steps:

Step 1.1: preparation of vinyl collagen

Collagen and phosphate buffer solution were added into an Erlenmeyer flask, then placing the Erlenmeyer flask in a constant temperature magnetic stirrer at 70° C., heating and stirring until the collagen was completely dissolved, and then lowering the temperature of the constant temperature magnetic stirrer after 20 minutes to 50° C., adding methacrylic anhydride to the Erlenmeyer flask to react for 2 hours. The amount of methacrylic anhydride was 3/500 of the volume of the phosphate buffer solution, dialyzing for 24 hours, freeze-drying for 12 hours, and the storing in a desiccator.

Every 1 g of collagen required 10 ml of phosphate buffer solution; the pH of the phosphate buffer solution was 7.4.

Step 1.2: preparation of vinyl collagen microspheres

A 15% (wt/wt) vinyl collagen aqueous solution was prepared. Liquid paraffin and a surfactants in a volume ratio of 50:1 were added into a three-necked flask and mixed, then placing the three-necked flask in a water bath, and mixing at 400 rpm/min. The temperature of the water bath was raised to 60° C., and after 10 minutes, the vinyl collagen aqueous solution was slowly added dropwise to the liquid paraffin. The volume ratio of the vinyl collagen aqueous solution to the liquid paraffin was 1:4. After 20 minutes of emulsification, the flask was quickly placed an ice bath at 0-10° C. After 15 minutes, a glutaraldehyde aqueous solution was added for cross-linking for 2 hours. The amount of glutaraldehyde aqueous solution added was 0.4% of the volume of liquid paraffin. Isopropanol was added to the emulsion. The amount of isopropanol added was 1/10 of the volume of liquid paraffin. The mixture was stirred for 10 minutes, the reaction was stopped, and the mixture was centrifuged to separate the vinyl collagen microspheres, and then washed with isopropanol, acetone, and water 3 times to remove impurities. After freeze-drying, pure vinyl collagen microspheres were obtained.

The glutaraldehyde in the glutaraldehyde aqueous solution was 25% (wt/wt); and the surfactant was Span80. When preparing the vinyl collagen aqueous solution, it needs to be heated to 60° C. under stirring to aid solubility.

Step 2: treating the polyamide fiber substrate with formaldehyde to obtain hydroxylated polyamide fiber substrate, and treating the hydroxylated polyamide fiber substrate with MPS to obtain sulfhydrylated polyamide fiber substrate.

Step 2 was implemented in accordance with the following steps:

Step 2.1: a 55 mm diameter polyamide fiber fabric disc was used as the polyamide fiber substrate and was ultrasonically cleaned with acetone for half an hour, and 85% (wt/wt) phosphoric acid solution and 40% (wt/wt) formaldehyde solution were mixed at a volume ratio of 3:100 to obtain a solution A, and the polyamide fiber substrate was immersed in the solution A, reacting at 60° C. for 15 hours, and then taken out. The polyamide fiber substrate was rinsed with a large amount of running water to obtain the hydroxylated polyamide fiber substrate;

Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 70° C. for 12 hours to obtain the sulfhydrylated polyamide fiber substrate after washing with isopropanol, which was dried at 60° C. to obtain pure sulfhydrylated polyamide fiber substrate.

Step 3: the vinyl collagen microspheres were modified on the sulfhydrylated polyamide fiber substrate through "mercaptoene" click reaction to obtain a vinyl collagen microsphere polyamide fiber composite material.

Step 3 was implemented according to the following steps:

Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;

Step 3.2: using the vinyl collagen microspheres prepared in step 1 to prepare a 2% (wt/wt) vinyl collagen microsphere aqueous solution, adding a certain amount of photoinitiator to it to obtain a solution C. The amount of photoinitiator was 0.006% of the weight of the aqueous solution of vinyl collagen microspheres. Immersing the product A prepared in step 3.1 into the solution C, then taking it out for sonication for 30 minutes, and carrying out the mercaptoene click chemistry reaction under a UV lamp for 3 hours to obtain the vinyl collagen microsphere polyamide fiber composite material.

EXAMPLE 2

The method of preparing vinyl collagen microsphere polyamide fiber composite material was specifically implemented according to the following steps:

Step 1: collagen was modified by methacrylic anhydride to obtain vinyl collagen; then the vinyl collagen was emulsified and cross-linked to obtain vinyl collagen microspheres;

Step 1 was implemented according to the following steps:

Step 1.1: preparation of vinyl collagen

Collagen and phosphate buffer solution were added into an Erlenmeyer flask, then placing the Erlenmeyer flask in a constant temperature magnetic stirrer at 70° C., heating and stirring until the collagen was completely dissolved, and then lowering the temperature of the constant temperature magnetic stirrer after 20 minutes to 50° C., adding methacrylic anhydride to the Erlenmeyer flask to react for 2 hours. The amount of methacrylic anhydride was 3/500 of the volume of the phosphate buffer solution, dialyzing for 24 hours, freeze-drying for 24 hours, and the storing in a desiccator.

Every 1 g of collagen required 10 ml of phosphate buffer solution; the pH of the phosphate buffer solution was 7.4.

Step 1.2: preparation of vinyl collagen microspheres

A 20% (wt/wt) vinyl collagen aqueous solution was prepared. Liquid paraffin and a surfactants in a volume ratio of 50:1 were added into a three-necked flask and mixed, then placing the three-necked flask in a water bath, and mixing at 1200 rpm/min. The temperature of the water bath was raised to 60° C., and after 10 minutes, the vinyl collagen aqueous solution was slowly added dropwise to the liquid paraffin. The volume ratio of the vinyl collagen aqueous solution to the liquid paraffin was 1:8. After 20 minutes of emulsification, the flask was quickly placed an ice bath at 0-10° C. After 15 minutes, a glutaraldehyde aqueous solution was added for cross-linking for 2 hours. The amount of glutaraldehyde aqueous solution added was 0.4% of the volume of liquid paraffin. Isopropanol was added to the emulsion. The amount of isopropanol added was 1/10 of the volume of liquid paraffin. The mixture was stirred for 10 minutes, the reaction was stopped, and the mixture was centrifuged to separate the vinyl collagen microspheres, and then washed with isopropanol, acetone, and water 3 times to remove impurities. After freeze-drying, pure vinyl collagen microspheres were obtained.

The glutaraldehyde in the glutaraldehyde aqueous solution was 25% (wt/wt); and the surfactant was Span80. When preparing the vinyl collagen aqueous solution, it needs to be heated to 60° C. under stirring to aid solubility.

Step 2: treating the polyamide fiber substrate with formaldehyde to obtain hydroxylated polyamide fiber substrate, and treating the hydroxylated polyamide fiber substrate with MPS to obtain sulfhydrylated polyamide fiber substrate.

Step 2 was implemented in accordance with the following steps:

Step 2.1: a 55 mm diameter polyamide fiber fabric disc was used as the polyamide fiber substrate and was ultrasonically cleaned with acetone for half an hour, and 85% (wt/wt) phosphoric acid solution and 40% (wt/wt) formaldehyde solution were mixed at a volume ratio of 3:100 to obtain a solution A, and the polyamide fiber substrate was immersed in the solution A, reacting at 60° C. for 15 hours, and then taken out. The polyamide fiber substrate was rinsed with a large amount of running water to obtain the hydroxylated polyamide fiber substrate;

Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 70° C. for 12 hours to obtain the sulfhydrylated polyamide fiber substrate after washing with isopropanol, which was dried at 60° C. to obtain pure sulfhydrylated polyamide fiber substrate.

Step 3: the vinyl collagen microspheres were modified on the sulfhydrylated polyamide fiber substrate through "mercaptoene" click reaction to obtain a vinyl collagen microsphere polyamide fiber composite material.

Step 3 was implemented according to the following steps:

Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;

Step 3.2: using the vinyl collagen microspheres prepared in step 1 to prepare a 10% (wt/wt) vinyl collagen microsphere aqueous solution, adding a certain amount of photoinitiator to it to obtain a solution C. The amount of photoinitiator was 0.01% of the weight of the aqueous solution of vinyl collagen microspheres.

Immersing the product A prepared in step 3.1 into the solution C, then taking it out for sonication for 30 minutes, and carrying out the mercaptoene click chemistry reaction under a UV lamp for 7 hours to obtain the vinyl collagen microsphere polyamide fiber composite material.

EXAMPLE 3

The method of preparing vinyl collagen microsphere polyamide fiber composite material was specifically implemented according to the following steps:

Step 1: collagen was modified by methacrylic anhydride to obtain vinyl collagen; then the vinyl collagen was emulsified and cross-linked to obtain vinyl collagen microspheres;

Step 1 was implemented according to the following steps:

Step 1.1: preparation of vinyl collagen

Collagen and phosphate buffer solution were added into an Erlenmeyer flask, then placing the Erlenmeyer flask in a constant temperature magnetic stirrer at 70° C., heating and stirring until the collagen was completely dissolved, and then lowering the temperature of the constant temperature magnetic stirrer after 20 minutes to 50° C., adding methacrylic anhydride to the Erlenmeyer flask to react for 2 hours. The amount of methacrylic anhydride was 3/500 of the volume of the phosphate buffer solution, dialyzing for 24 hours, freeze-drying for 20 hours, and the storing in a desiccator.

Every 1 g of collagen required 10 ml of phosphate buffer solution; the pH of the phosphate buffer solution was 7.4.

Step 1.2: preparation of vinyl collagen microspheres

A 20% (wt/wt) vinyl collagen aqueous solution was prepared. Liquid paraffin and a surfactants in a volume ratio of 50:1 were added into a three-necked flask and mixed, then placing the three-necked flask in a water bath, and mixing at 800 rpm/min. The temperature of the water bath was raised to 60° C., and after 10 minutes, the vinyl collagen aqueous solution was slowly added dropwise to the liquid paraffin. The volume ratio of the vinyl collagen aqueous solution to the liquid paraffin was 1:8. After 20 minutes of emulsification, the flask was quickly placed an ice bath at 0-10° C. After 15 minutes, a glutaraldehyde aqueous solution was added for cross-linking for 2 hours. The amount of glutaraldehyde aqueous solution added was 0.6% of the volume of liquid paraffin. Isopropanol was added to the emulsion. The amount of isopropanol added was 1/10 of the volume of liquid paraffin. The mixture was stirred for 10 minutes, the reaction was stopped, and the mixture was centrifuged to separate the vinyl collagen microspheres, and then washed with isopropanol, acetone, and water 3 times to remove impurities. After freeze-drying, pure vinyl collagen microspheres were obtained.

The glutaraldehyde in the glutaraldehyde aqueous solution was 25% (wt/wt); and the surfactant was Span80. When preparing the vinyl collagen aqueous solution, it needs to be heated to 60° C. under stirring to aid solubility.

Step 2: treating the polyamide fiber substrate with formaldehyde to obtain hydroxylated polyamide fiber substrate, and treating the hydroxylated polyamide fiber substrate with MPS to obtain sulfhydrylated polyamide fiber substrate.

Step 2 was implemented in accordance with the following steps:

Step 2.1: a 55 mm diameter polyamide fiber fabric disc was used as the polyamide fiber substrate and was ultrasonically cleaned with acetone for half an hour, and 85% (wt/wt) phosphoric acid solution and 40% (wt/wt) formaldehyde solution were mixed at a volume ratio of 3:100 to obtain a solution A, and the polyamide fiber substrate was immersed in the solution A, reacting at 60° C. for 15 hours, and then taken out. The polyamide fiber substrate was rinsed with a large amount of running water to obtain the hydroxylated polyamide fiber substrate;

Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 60° C. for 15 hours to obtain the sulfhydrylated polyamide fiber substrate after washing with isopropanol, which was dried at 60° C. to obtain pure sulfhydrylated polyamide fiber substrate.

Step 3: the vinyl collagen microspheres were modified on the sulfhydrylated polyamide fiber substrate through "mercaptoene" click reaction to obtain a vinyl collagen microsphere polyamide fiber composite material.

Step 3 was implemented according to the following steps:

Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;

Step 3.2: using the vinyl collagen microspheres prepared in step 1 to prepare a 6% (wt/wt) vinyl collagen microsphere aqueous solution, adding a certain amount of photoinitiator to it to obtain a solution C. The amount of photoinitiator was 0.008% of the weight of the aqueous solution of vinyl collagen microspheres. Immersing the product A prepared in step 3.1 into the solution C, then taking it out for sonication for 30 minutes, and carrying out the mercaptoene click chemistry reaction under a UV lamp for 4 hours to obtain the vinyl collagen microsphere polyamide fiber composite material.

EXAMPLE 4

The method of preparing vinyl collagen microsphere polyamide fiber composite material was specifically implemented according to the following steps:

Step 1: collagen was modified by methacrylic anhydride to obtain vinyl collagen; then the vinyl collagen was emulsified and cross-linked to obtain vinyl collagen microspheres;

Step 1 was implemented according to the following steps:

Step 1.1: preparation of vinyl collagen

Collagen and phosphate buffer solution were added into an Erlenmeyer flask, then placing the Erlenmeyer flask in a constant temperature magnetic stirrer at 70° C., heating and stirring until the collagen was completely dissolved, and then lowering the temperature of the constant temperature magnetic stirrer after 20 minutes to 50° C., adding methacrylic anhydride to the Erlenmeyer flask to react for 2 hours. The amount of methacrylic anhydride was 3/500 of the volume of the phosphate buffer solution, dialyzing for 24 hours, freeze-drying for 15 hours, and the storing in a desiccator.

Every 1 g of collagen required 10 ml of phosphate buffer solution; the pH of the phosphate buffer solution was 7.4.

Step 1.2: preparation of vinyl collagen microspheres

A 25% (wt/wt) vinyl collagen aqueous solution was prepared. Liquid paraffin and a surfactants in a volume ratio of 50:1 were added into a three-necked flask and mixed, then placing the three-necked flask in a water bath, and mixing at 800 rpm/min. The temperature of the water bath was raised to 60° C., and after 10 minutes, the vinyl collagen aqueous solution was slowly added dropwise to the liquid paraffin. The volume ratio of the vinyl collagen aqueous solution to the liquid paraffin was 1:7. After 20 minutes of emulsification, the flask was quickly placed an ice bath at 0-10° C. After 15 minutes, a glutaraldehyde aqueous solution was added for cross-linking for 2 hours. The amount of glutaraldehyde aqueous solution added was 0.5% of the volume of liquid paraffin. Isopropanol was added to the emulsion. The amount of isopropanol added was 1/10 of the volume of liquid paraffin. The mixture was stirred for 10 minutes, the reaction was stopped, and the mixture was centrifuged to separate the vinyl collagen microspheres, and then washed with isopropanol, acetone, and water 3 times to remove impurities. After freeze-drying, pure vinyl collagen microspheres were obtained.

The glutaraldehyde in the glutaraldehyde aqueous solution was 25% (wt/wt); and the surfactant was Span80. When preparing the vinyl collagen aqueous solution, it needs to be heated to 60° C. under stirring to aid solubility.

Step 2: treating the polyamide fiber substrate with formaldehyde to obtain hydroxylated polyamide fiber substrate, and treating the hydroxylated polyamide fiber substrate with MPS to obtain sulfhydrylated polyamide fiber substrate.

Step 2 was implemented in accordance with the following steps:

Step 2.1: a 55 mm diameter polyamide fiber fabric disc was used as the polyamide fiber substrate and was ultrasonically cleaned with acetone for half an hour, and 85% (wt/wt) phosphoric acid solution and 40% (wt/wt) formaldehyde solution were mixed at a volume ratio of 3:100 to obtain a solution A, and the polyamide fiber substrate was immersed in the solution A, reacting at 60° C. for 15 hours, and then taken out. The polyamide fiber substrate was rinsed with a large amount of running water to obtain the hydroxylated polyamide fiber substrate;

Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 70° C. for 12 hours to obtain the sulfhydrylated polyamide fiber substrate after washing with isopropanol, which was dried at 60° C. to obtain pure sulfhydrylated polyamide fiber substrate.

Step 3: the vinyl collagen microspheres were modified on the sulfhydrylated polyamide fiber substrate through "mercaptoene" click reaction to obtain a vinyl collagen microsphere polyamide fiber composite material.

Step 3 was implemented according to the following steps:

Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;

Step 3.2: using the vinyl collagen microspheres prepared in step 1 to prepare a 18% (wt/wt) vinyl collagen microsphere aqueous solution, adding a certain amount of photoinitiator to it to obtain a solution C. The amount of photoinitiator was 0.006% of the weight of the aqueous solution of vinyl collagen microspheres. Immersing the product A prepared in step 3.1 into the solution C, then taking it out for sonication for 30 minutes, and carrying out the mercaptoene click chemistry reaction under a UV lamp for 7 hours to obtain the vinyl collagen microsphere polyamide fiber composite material.

EXAMPLE 5

The method of preparing vinyl collagen microsphere polyamide fiber composite material was specifically implemented according to the following steps:
Step 1: collagen was modified by methacrylic anhydride to obtain vinyl collagen; then the vinyl collagen was emulsified and cross-linked to obtain vinyl collagen microspheres;
Step 1 was implemented according to the following steps:
Step 1.1: preparation of vinyl collagen
Collagen and phosphate buffer solution were added into an Erlenmeyer flask, then placing the Erlenmeyer flask in a constant temperature magnetic stirrer at 70° C., heating and stirring until the collagen was completely dissolved, and then lowering the temperature of the constant temperature magnetic stirrer after 20 minutes to 50° C., adding methacrylic anhydride to the Erlenmeyer flask to react for 2 hours. The amount of methacrylic anhydride was 3/500 of the volume of the phosphate buffer solution, dialyzing for 24 hours, freeze-drying for 12 hours, and the storing in a desiccator.
Every 1 g of collagen required 10 ml of phosphate buffer solution; the pH of the phosphate buffer solution was 7.4.
Step 1.2: preparation of vinyl collagen microspheres
A 32.5% (wt/wt) vinyl collagen aqueous solution was prepared. Liquid paraffin and a surfactants in a volume ratio of 50:1 were added into a three-necked flask and mixed, then placing the three-necked flask in a water bath, and mixing at 1200 rpm/min. The temperature of the water bath was raised to 60° C., and after 10 minutes, the vinyl collagen aqueous solution was slowly added dropwise to the liquid paraffin. The volume ratio of the vinyl collagen aqueous solution to the liquid paraffin was 1:7. After 20 minutes of emulsification, the flask was quickly placed an ice bath at 0-10° C. After 15 minutes, a glutaraldehyde aqueous solution was added for cross-linking for 2 hours. The amount of glutaraldehyde aqueous solution added was 0.4% of the volume of liquid paraffin. Isopropanol was added to the emulsion. The amount of isopropanol added was 1/10 of the volume of liquid paraffin. The mixture was stirred for 10 minutes, the reaction was stopped, and the mixture was centrifuged to separate the vinyl collagen microspheres, and then washed with isopropanol, acetone, and water 3 times to remove impurities. After freeze-drying, pure vinyl collagen microspheres were obtained.
The glutaraldehyde in the glutaraldehyde aqueous solution was 25% (wt/wt); and the surfactant was Span80. When preparing the vinyl collagen aqueous solution, it needs to be heated to 60° C. under stirring to aid solubility.
Step 2: treating the polyamide fiber substrate with formaldehyde to obtain hydroxylated polyamide fiber substrate, and treating the hydroxylated polyamide fiber substrate with MPS to obtain sulfhydrylated polyamide fiber substrate.
Step 2 was implemented in accordance with the following steps:
Step 2.1: a 55 mm diameter polyamide fiber fabric disc was used as the polyamide fiber substrate and was ultrasonically cleaned with acetone for half an hour, and 85% (wt/wt) phosphoric acid solution and 40% (wt/wt) formaldehyde solution were mixed at a volume ratio of 3:100 to obtain a solution A, and the polyamide fiber substrate was immersed in the solution A, reacting at 60° C. for 15 hours, and then taken out. The polyamide fiber substrate was rinsed with a large amount of running water to obtain the hydroxylated polyamide fiber substrate;
Step 2.2: mixing (3-mercaptopropyl)trimethoxysilane and isopropanol in a volume ratio of 7:1000 to obtain a solution B, placing the hydroxylated polyamide fiber prepared in step 2.1 into the solution B, and reacting under nitrogen atmosphere at 70° C. for 12 hours to obtain the sulfhydrylated polyamide fiber substrate after washing with isopropanol, which was dried at 60° C. to obtain pure sulfhydrylated polyamide fiber substrate.
Step 3: the vinyl collagen microspheres were modified on the sulfhydrylated polyamide fiber substrate through "mercaptoene" click reaction to obtain a vinyl collagen microsphere polyamide fiber composite material.
Step 3 was implemented according to the following steps:
Step 3.1: immersing the sulfhydrylated polyamide fiber substrate prepared in step 2 in a 5 mmol/L tris(2-carboxyethyl)phosphine hydrochloride solution (TCEP) for 1 hour to obtain a product A;
Step 3.2: using the vinyl collagen microspheres prepared in step 1 to prepare a 2% (wt/wt) vinyl collagen microsphere aqueous solution, adding a certain amount of photoinitiator to it to obtain a solution C. The amount of photoinitiator was 0.006% of the weight of the aqueous solution of vinyl collagen microspheres. Immersing the product A prepared in step 3.1 into the solution C, then taking it out for sonication for 30 minutes, and carrying out the mercaptoene click chemistry reaction under a UV lamp for 7 hours to obtain the vinyl collagen microsphere polyamide fiber composite material.

The invention claimed is:
1. A method of preparing a vinyl collagen microsphere polyamide fiber composite material, comprising the following steps:
step 1: modifying a collagen with methacrylic anhydride to obtain a vinyl collagen, then emulsifying and cross-linking the vinyl collagen to obtain vinyl collagen microspheres;
step 2: treating a polyamide fiber substrate with formaldehyde to obtain a hydroxylated polyamide fiber substrate, treating the hydroxylated polyamide fiber substrate with (3-mercaptopropyl)trimethoxysilane (MPS) to obtain a sulfhydrylated polyamide fiber substrate; and
step 3: modifying the sulfhydrylated polyamide fiber substrate with the vinyl collagen microspheres to obtain the vinyl collagen microsphere polyamide fiber composite material.
2. The method according to claim 1, wherein the step 1 comprises:
step 1.1: adding the collagen and a phosphate buffer solution into a flask, heating at 70° C. and stirring until the collagen is completely dissolved, lowering to 50° C., after 20 minutes adding methacrylic anhydride, reacting for 2 hours, wherein a volume ratio of methacrylic anhydride:the phosphate buffer solution is 3:500, dialyzing for 24 hours, freeze-drying for 12-24 hours to obtain the vinyl collagen, and storing the vinyl collagen in a desiccator for later use, wherein a ratio of the collagen:the phosphate buffer solution is 1 g:10 ml; and step 1.2: preparing a vinyl collagen aqueous solution with a concentration of 15% to 40% (wt/wt), adding a liquid paraffin and a surfactant in a volume ratio of 50:1 into a three-necked flask and mixing, placing the three-necked flask in a water bath, stirring at 400-1200 rpm and heating the water bath to 60° C. at the speed of 1° C./min, after 10 minutes adding the vinyl collagen aqueous solution to the liquid paraffin and the surfactant, a volume ratio of the vinyl collagen aqueous solution to the liquid paraffin being 1:4-8, emulsifying for 20 minutes, transferring the three-necked flask to an ice bath at 0-10° C., after 15 minutes adding a glutaraldehyde aqueous solution and cross-linking for 2 hours, the glutaraldehyde aqueous solution added being 0.4%-1% (vol/vol) of the liquid paraffin, adding isopropanol, the isopropanol added being 1/10 (vol/vol) of the liquid paraffin, stirring for 10 minutes, stopping the cross-linking, centrifugating, washing with isopropanol, acetone, and water 3 times to remove impurities, freeze-drying to obtain the vinyl collagen microspheres;

wherein the glutaraldehyde aqueous solution has a concentration of 25% (wt/wt).

3. The method according to claim 2, wherein, in the step 1.1, a pH of the phosphate buffer solution is 7.4.

4. The method according to claim 2, wherein the step 1.2 further comprises: heating to 60° C. under agitation to aid solubility to obtain the vinyl collagen aqueous solution.

5. The method according to claim 1, wherein the step 2 comprises:

step 2.1: ultrasonically cleaning the polyamide fiber substrate with acetone for 0.5 hour, the polyamide fiber substrate being a 55-mm-diameter polyamide fiber fabric disc, mixing a 85% (wt) phosphoric acid solution and a 40% (wt) formaldehyde solution at a volume ratio of 3:100 to obtain a solution A, immersing the polyamide fiber substrate in the solution A, reacting at 60° C. for 15 hours, rinsing the polyamide fiber substrate with water to obtain the hydroxylated polyamide fiber substrate;

step 2.2: mixing (3-mercaptopropyl)trimethoxysilane and isopropanol in a volume ratio of 7:1000 to obtain a solution B, placing the hydroxylated polyamide fiber substrate prepared in the step 2.1 into the solution B, reacting under nitrogen atomsphere at 70° C. for 12 hours, washing with isopropanol, and drying at 60° C. to obtain the sulfhydrylated polyamide fiber substrate.

6. The method according to claim 1, wherein the step 3 comprises:

step 3.1: immersing the sulfhydrylated polyamide fiber substrate prepared in a 5 mmol/L tris(2-carboxyethyl) phosphine hydrochloride solution for 1 hour to obtain a product A; and step 3.2: preparing a vinyl collagen microspheres aqueous solution with a concentration of 2%-18% (wt/wt), adding a photoinitiator to obtain a solution C, a weight ratio of the photoinitiator:the vinyl collagen microspheres aqueous solution being 0.006%-0.01%, immersing the product A prepared in the step 3.1 into the solution C, sonicating for 30 minutes, reacting under a UV lamp for 3-7 hours to obtain the vinyl collagen microsphere polyamide fiber composite material.

\* \* \* \* \*